United States Patent Office 3,720,709
Patented Mar. 13, 1973

3,720,709
SULFONYLPHENOXYALKANOIC ACIDS
James M. Sprague, Gwynedd Valley, and Carl Ziegler, Glenside, Pa., assignors to Merck & Co., Inc., Rahway, N.J.
No Drawing. Filed Dec. 16, 1969, Ser. No. 885,641
Int. Cl. C07c 143/78
U.S. Cl. 260—519
14 Claims

ABSTRACT OF THE DISCLOSURE (Sulfonylphenoxy)alkanoic acids and (mono- or di-substituted sulfamoylphenoxy)alkanoic acids and the salts, esters and amide derivatives wherein the benzene ring may be substituted by halo, trihalomethyl, lower alkyl, nitro, carboxy or a hydrocarbylene moiety. The products are prepared by either of two methods, one of which consists in treating a (halosulfonylphenoxy)alkanoic acid with a primary or secondary amine and the second of which comprises treating a (thiophenoxy)alkanoic acid with a oxidizing agent. The products are useful as uricosuric agents in the treatment of gout and gouty arthritis.

This invention relates to a new class of chemical compounds which can be described generally as (sulfonyl and mono- or di-substituted sulfamoylphenoxy)alkanoic acids and the salt, ester and amide derivatives. It is also an object of this invention to describe novel methods for the preparation of the (sulfonyl and mono- or di-substituted sulfamoylphenoxy)alkanoic acids.

Pharmacological studies show that the instant products are effective uricosuric agents which can be used in the treatment of gout and gouty arthritis by increasing the excretion of uric acid by the kidney. The instant products are also a valuable adjuvant for inhibiting excretion of of penicillin, thus maintaining high antibiotic levels in the treatment of conditions that require intensive penicillin therapy.

The (sulfonyl and mono- or d-substituted sulfamoylphenoxy)alkanoic acids of this invention are compounds having the following structural formula:

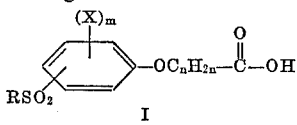

I wherein R is alkyl, for example, straight or branched chain alkyl such as methyl, ethyl, n-propyl, n-butyl, pentyl, hexyl, 4-heptyl, octyl, decyl and the like; cycloalkyl, for example, mononuclear cycloalkyl containing from 5 to 6 nuclear carbon atoms such as cyclopentyl, cyclohexyl and the like; alkynyl such as 2-butynyl and the like; alkenyl such as 2-butenyl and the like or a primary or secondary amino radical of the formula:

wherein $R^1$ is hydrogen, alkyl, for example, lower alkyl such as ethyl, n-propyl, n-butyl, pentyl, hexyl and the like, cycloalkyl, for example, a mononuclear cycloalkyl containing from 5 to 6 nuclear carbon atoms such as cyclopentyl, cyclohexyl and the like; $R^2$ is alkyl, for example, lower alkyl such as ethyl, n-propyl, n-butyl, pentyl, hexyl and the like, cycloalkyl, for example, a mononuclear cycloalkyl containing from 5 to 6 nuclear carbon atoms such as cyclopentyl, cyclohexyl and the like and, taken together, $R^1$ and $R^2$ may be joined with the nitrogen to which they are attached to form a saturated 5- or 6-membered heterocyclic ring such as pyrrolidinyl) morpholino, piperidino and the like; X is halo, for example, bromo, chloro, fluoro and the like, lower alkyl such as methyl and the like, nitro, trihalomethyl, such as trifluoromethyl and the like, or carboxy or, taken together, two X radicals on adjacent carbon atoms of the benzene ring may be joined to form a hydrocarbylene chain containing from 3 to 4 carbon atoms between their point of attachment, for example, trimethylene, tetramethylene or 1,3 - butadienylene (i.e., —CH=CH—CH=CH—), m is an integer having a value of 0–4 and n is an integer having a value of 1–4 and the non-toxic, pharmaceutically acceptable salts thereof as, for example, those desirved from the alkali metals and alkaline earth metals as, for example, the alkali metal and alkaline earth metal carbonates, hydroxides and alkoxides such as sodium carbonate, sodium hydroxide, magnesium carbonate, calcium hydroxide, potassium hydroxide, sodium methoxide and the like or from secondary amines as, for example, dialkylamines or heterocyclic amines such as dimethylamine, diethylamine, piperidine, pyridine, pyrrolidine, morpholine and the like.

A preferred embodiment of this invention relates to (4-mono- or di-substituted sulfamoylphenoxy)acetic acids having the following structural formula:

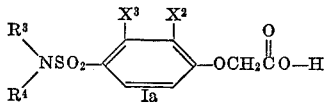

Ia wherein $R^3$ and $R^4$ are lower alkyl containing from 3 to 7 carbon atoms and $X^2$ and $X^3$ are selected from hydrogen, halo or trihalomethyl and the non-toxic, pharmaceutically acceptable salts thereof as, for example, the alkali metal or alkaline earth metal salts. This class of compounds exhibits good uricosuric activity and represents a preferred subgroup of compounds within the scope of this invention.

The (sulfonyl and mono- or di-substituted sulfamoylphenoxy)alkanoic acids (I) are conveniently prepared by either of two methods depending upon the nature of the R group in the desired (sulfonylphenoxy)alkanoic acid product (I). One such method, wherein R is a primary or secondary amino radical, comprises treating a (halosulfonylphenoxy)alkanoic acid (II, infra) with a primary or secondary amine. The second method, wherein R in Formula I, supra, represents alkyl, cycloalkyl, alkenyl or alkynyl, comprises treating a nuclear thio (or nuclear sulfinyl) substituted phenoxyalkanoic acid with an oxidizing agent.

The method for preparing the (mono-substituted or di-substituted sulfamoylphenoxy)alkanoic acids (Ib) wherein R is a primary or secondary amino radical, comprises the reaction of a (halosulfonylphenoxy)alkanoic acid (II, infra) with an amine of the formula:

wherein $R^1$ and $R^2$ are as defined above. Any solvent which is substantially inert to the reactants may be employed as, for example, acetone, benzene, pyridine and the like; however, it is preferred to use an excess of the amine which is employed as the starting material in the process. The temperature at which the reaction is conducted is not critical but, in general, it is most desirable to conduct the process at a temperature in the range of from about 25° C. to 100° C. The following equation illustrates this process:

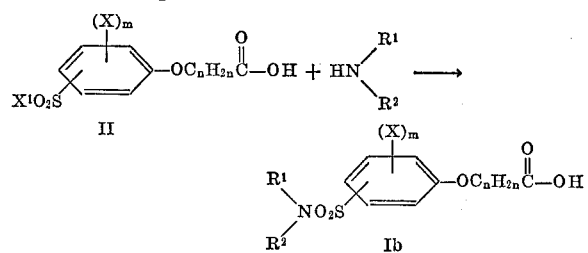

wherein $R^1$, $R^2$, X, m and n are as defined above and $X^1$ is halo such as bromo, chloro and the like.

These products corresponding to Formula I, supra, wherein R is alkyl, cycloalkyl, alkenyl or alkynyl are obtained by treating the corresponding (sulfinylphenoxy) alkanoic acid (IV, infra) with an oxidizing agent. The following equation illustrates this process:

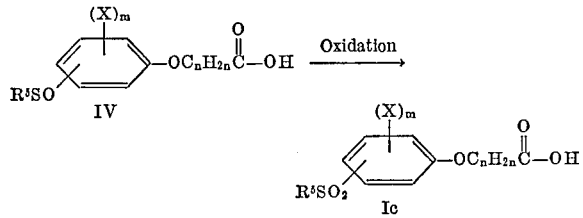

wherein X, m and n are as defined above and $R^5$ is alkyl, cycloalkyl, alkenyl or alkynyl. Alternatively, in lieu of the (sulfinylphenoxy)alkanoic acid precursor (IV) it is also possible to employ as a reactant in this process the corresponding (thiophenoxy)alkanoic acid (III, infra). According to this method of preparation, the (thiophenoxy)alkanoic acid reactant (III) is first oxidized to the corresponding (sulfinylphenoxy)alkanoic acid derivative (IV) and then to the desired (sulfonylphenoxy) alkanoic acid product (Ic). In practice, when it is desired to isolate the (sulfinylphenoxy)alkanoic acid derivative (IV) the (thiophenoxy)alkanoic acid (III) is treated with a stoichiometric amount of oxidizing agent. The (sulfinylphenoxy)alkanoic acid (IV) thus obtained may then be removed by filtration and, if desired, may be purified by recrystallization from a suitable solvent. The following equation illustrates this two-step process:

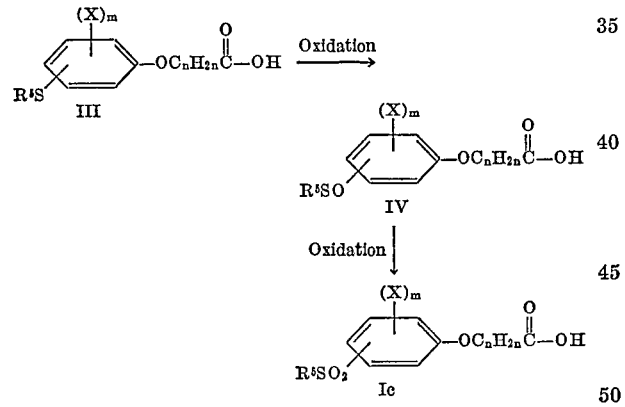

wherein $R^5$, X, m and n are as defined above. Oxidizing agents which are suitable for use in both oxidation steps include, for example, hydrogen peroxide, chromium trioxide, potassium permanganate and the like. The oxidation reaction may be conducted in any solvent in which the reactants are reasonably soluble and substantially inert. Suitable solvents include acetic acid, acetone and the like. Temperature is not particularly critical to the success of the reaction and, in general, temperatures in the range from about 0° to about 100° C. are suitable; however, it is usually convenient to conduct the reaction at temperatures in the range from about 0° C. to room temperature, and preferably, in an ice bath at about 0° C.

The (halosulfonylphenoxy)alkanoic acids (II, supra) employed as starting materials in the preparation of the (mono-substituted or di-substituted sulfamoylphenoxy) alkanoic acids (Ib) are conveniently prepared by one of two alternate processes. One such method of preparation comprises treating an appropriate (nuclear aminosubstituted phenoxy)alkanoic acid (V, infra) with a solution of sodium nitrite and an acid such as hydrochloric acid, perchloric acid or fluoroboric acid to form the corresponding diazonium salt (Va, infra) followed by treating said diazonium salt with a solution of sulfur dioxide and a cuprous halide, such as cuprous chloride, cuprous bromide or cuprous fluoride and the like in water or in a lower alkanoic acid such as acetic acid and the like. The reaction may be conducted at temperatures in the range of from about 0° C. up to about 25° C., however, it is preferred to conduct the process at a temperature range of from 0° C. to about 5° C. The following equation illustrates this process:

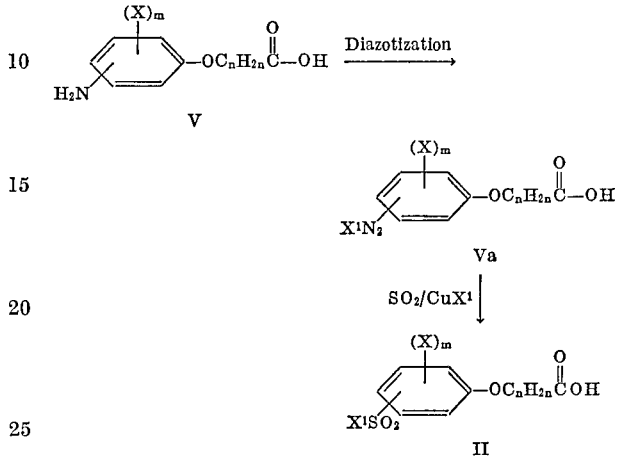

wherein X, m, n and $X^1$ are as defined above.

The second method by which the (halosulfonylphenoxy)alkanoic acids (II, supra) may be prepared comprises treating a suitable phenoxyalkanoic acid with a halosulfonic acid such as chlorosulfonic acid, fluosulfonic acid and the like. This reaction is conducted in a temperature range of from about 15° C. to about 25° C. The following equation illustrates this process:

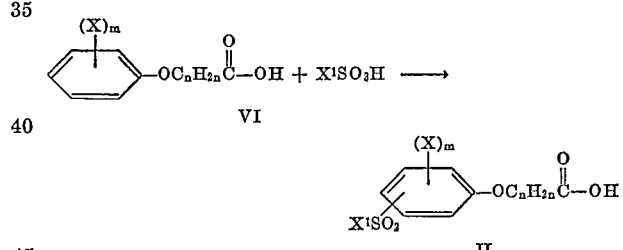

wherein X, m, n and $X^1$ are as defined above.

The (thiophenoxy)alkanoic acids employed as reactants in the foregoing oxidation synthesis (III, infra) are conveniently prepared by treating the corresponding (mercapto-phenoxy)alkanoic acid (VII, infra) with a base followed by treatment of the salt thus formed with an hydrocarbyl halide of the formula: $X^1R^5$ wherein $R^5$ and $X^1$ are as defined above. Suitable bases include the alkali metal alkoxides and alkali metal hydrides such as sodium methoxide, sodium ethoxide, sodium hydride and the like. Any solvent in which the reactants are soluble and which are inert to the reactants employed may be used, such as methanol, ethanol, benzene, toluene and the like. While the temperature at which the reaction is conducted is not a particularly critical aspect of this invention, temperatures ranging from ambient temperature up to the reflux temperature of the particular solvent used may be conveniently employed. The following equation illustrates this process:

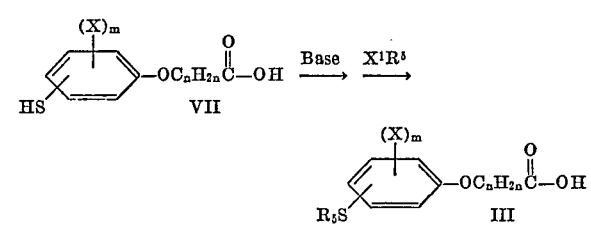

wherein $R^5$, X, $X^1$, m and n are as defined above.

The (mercaptophenoxy)alkanoic acids are either known compounds or are conveniently prepared from an appropriately substituted nitrophenol. Thus, for example, the nitrophenol, which may be obtained by treating the corresponding phenol with nitric acid in chloroform, is allowed to react with an ester of a haloalkanoic acid in the presence of a base such as sodium methoxide and the (nitrophenoxy)alkanoic acid ester thus obtained is then treated with a reducing agent as, for example, with hydrogen in the presence of a ruthenium on carbon catalyst to afford an (aminophenoxy)alkanoic acid ester which is diazotized to afford the corresponding diazo intermediate and then treated, successively, with potassium ethylxanthate and a base such as potassium hydroxide to obtain the desired (mercaptophenoxy)alkanoic acid. When the process is conducted under atmospheric conditions, the (mercaptophenoxy)alkanoic acid may contain the corresponding disulfide analogue due to atmospheric oxidation; therefore, it is advantageous to treat the crude mixture of mercaptan and disulfide with zinc dust in acetic acid to reduce the disulfide component to the (mercaptophenoxy)alkanoic acid.

Also included within this invention are the ester and amide derivatives of the instant products (I) which may be prepared by conventional methods known to those skilled in the art. Thus, for example, the ester derivatives may be prepared by the reaction of a (sulfonylphenoxy)alkanoic acid of this invention with an appropriate alcohol as, for example, with a lower alkanol such as methanol, ethanol, lower alkanamido lower alkanols such as 2-acetamidoethanol and the like, benzamido lower alkanols such as benzamidoethanol and the like or, alternatively, the sulfonylphenoxyalkanoic acid may be converted to its acid halide by conventional methods and the acid halide treated with an appropriate alcohol. The amide derivatives of the sulfonylphenoxyalkanoic acids may be prepared by treating said acid halide with ammonia or an appropriate mono- or dialkylamine or heterocyclic amine. Still another process for preparing the amide derivatives comprises the conversion of an ester of the sulfonylphenoxyalkanoic acid by treating the ester with ammonia or an appropriate monoalkylamine or dialkylamine. These and other equivalent methods for the preparation of the ester and amide derivatives will be apparent to those having ordinary skill in the art and to the extent that said derivatives are both nontoxic and physiologically acceptable to the body system said esters and amides are the functional equivalent of the corresponding sulfonylphenoxyalkanoic acid.

The examples which follow illustrate the sulfonylphenoxyalkanoic acids (I) of this invention and the methods by which they are prepared. However, the examples are illustrative only and it will be apparent to those having ordinary skill in the art that all of the products embraced by Formula I, supra, may also be prepared in an analogous manner by substituting the appropriate starting materials for those set forth in the examples.

EXAMPLE 1

4-(di-n-propylsulfamoyl)phenoxyacetic acid

Step A: 4-(chlorosulfonyl)phenoxyacetic acid.—A suspension of 42 g. (0.025 mole) of 4-aminophenoxyacetic acid in 100 ml. of glacial acetic acid and 90 ml. of concentrated hydrochloric acid is cooled to 0° C. and stirred vigorously while 17.5 g. (0.26 mole) of sodium nitrite in 60 ml. of water is added dropwise, at such a rate that the temperature never exceeds 5° C. While this is being done, a solution of 120 g. of sulfur dioxide in 250 ml. of acetic acid is prepared. To this is added 10 g. of cupric chloride in 25 ml. of water. The solution of the diazonium salt then is added to the sulfur dioxide solution as fast as foaming would allow. After an hour, the reaction is poured into 3 liters of ice water. The clear solution is extracted three times with 600 ml. of benzene. The extract is dried over calcium chloride, filtered and concentrated to a small volume. There is obtained 22.3 g. of 4-(chlorosulfonyl)phenoxyacetic acid, M.P. 145°–147° C.

Step B: 4-(di-n-propylsulfamoyl)phenoxyacetic acid.— A solution of 4.8 g. (0.019 mole) of 4-(chlorosulfonyl)phenoxyacetic acid in 20 ml. of acetone is stirred while 6 g. (0.06 mole) of di-n-propylamine is added in two portions. The reaction mixture becomes quite warm and is allowed to stand overnight. The solvent is removed and the residue triturated with water and dilute hydrochloric acid. The waxy product crystallizes slowly. Repeated recrystallization from benzene yields 2.2 g. of 4-(di-n-propylsulfamoyl)phenoxyacetic acid, M.P. 130°–132° C.

Elemental analysis for $C_{14}H_{21}NO_5S$.—Calc. (percent): C, 53.31; H, 6.71; N, 4.44. Found (percent): C, 53.13; H, 6.60; N, 4.40.

EXAMPLE 2

3-chloro-4-(di-n-propylsulfamoyl)phenoxyacetic acid

Step A: 3-chloro - 4 - (chlorosulfonyl)phenoxyacetic acid.—Chlorosulfonic acid (100 ml., 1.5 mole) is cooled and stirred while 46.5 g. (0.25 mole) of 3-chlorophenoxyacetic acid is added, in portions, as frothing allows. The temperature is below 10° C. The reaction then is stirred for 2 hours at room temperature after which it is poured carefully onto crushed ice. The solid product is filtered and air dried. Recrystallization of the solid from ether and hexane gives 26.5 g. of 3-chloro-4-(chlorosulfonyl)phenoxyacetic acid, M.P. 160°–173° C.

Step B: 3-chloro-4-(di-n-propylsulfamoyl)phenoxyacetic acid.—A solution of 6 g. (0.06 mole) of di-n-propylamine in 50 ml. of acetone is cooled in an ice bath and stirred while 8.6 g. of 3-chloro-4-(chlorosulfonyl)phenoxyacetic acid (0.03 mole) is added in portions. After several hours, solvent is removed and the residue treated with water and acidified with dilute hydrochloric acid. The oily product slowly crystallizes. After several recrystallizations from benzene-hexane, there is obtained 5.4 g. of 3-chloro-4-(di-n-propylsulfamoyl)phenoxyacetic acid, M.P. 85°–87° C.

Elemental analysis for $C_{14}H_{20}ClNO_5S$.—Calc. (percent): C, 48.06; H, 5.76; N, 4.00. Found (percent): C, 48.30; H, 5.68; N, 3.98.

EXAMPLE 3

3-chloro-4-(di-n-butylsulfamoyl)phenoxyacetic acid

By substituting an equivalent amount of di-n-butylamine for the dipropylamine in Example 2, Step B, and by following substantially the procedure described therein, there was obtained 3-chloro-4-di-n-butylsulfamoylphenoxyacetic acid. Final purification was accomplished by recrystallization from hexane to yield 3-chloro-4-(di-n-butylsulfamoyl)phenoxyacetic acid, M.P. 68°–70° C.

Elemental analysis for $C_{16}H_{24}ClNO_5S$.—Calc. (percent): C, 50.85; H, 6.40; N, 3.71. Found (percent): C, 51.14; H, 6.52; N, 3.65.

EXAMPLE 4

3-chloro-4-(4-heptylsulfonyl)phenoxyacetic acid

Step A: Ethyl (3-chloro-4-nitrophenoxy)acetate.—Sodium (20.4 g., 0.887 mole) is dissolved in absolute ethanol (750 ml.). To this solution is added 3-chloro-4-nitrophenol (154 g., 0.887 mole) dissolved in absolute ethanol (200 ml.). The solution is heated to boiling and ethyl bromoacetate (148 g., 0.887 mole) is added. The mixture then is heated for 16 hours, the alcohol distilled and water is added to the residue. The mixture is extracted with ether and the ether extract dried and evaporated. The residue is crystallized from ethanol to give 140 g. of ethyl (3-chloro-4-nitrophenoxy)acetate, M.P. 59°–60° C.

Elemental analysis for $C_{10}H_{10}ClNO_5$.—Calc. (percent): C, 46.25; H, 3.88. Found (percent): C, 46.60; H, 3.92.

Step B: Ethyl (3-chloro-4-aminophenoxy)acetate.— To a slurry of 10% ruthenium on carbon (1.5 g.) in ethanol, there is added a slurry of ethyl (3-chloro-4-nitrophenoxy)acetate (51.94 g., 0.02 mole) in ethanol (250 ml.). The mixture is hydrogenated in a Parr apparatus, the calculated amount of hydrogen being absorbed in 23 hours. Removal of the catalyst and solvent leaves ethyl (3-chloro-4-aminophenoxy)acetate (43 g.) which melts at approximately 67° C. This product is used in the next step without further purification.

Step C: 3-chloro-4-mercaptophenoxyacetic acid.—Ethyl (3-chloro-4-aminophenoxy)acetate (78.5 g.) is added portionwise to a mixture of 65 ml. of concentrated hydrochloric acid and 290 ml. of water at 5° C. and then a solution of sodium nitrite (25.6 g.) in water (58 ml.) is added dropwise at 5° C. The reaction mixture is stirred for 0.5 hour and filtered. The solution is then added dropwise at 45°–50° C. to a stirred solution of potassium ethylxanthate (76.0 g.) in water (83.0 ml.). The mixture then is heated for one additional hour, cooled and extracted with ether. The dried ether solution is evaporated, the residue dissolved in ethanol (300 ml.) and the solution heated to boiling. The heat is removed and potassium hydroxide pellets (89.0 g.) are added at such a rate as to maintain boiling. The mixture then is refluxed for one hour. Upon cooling, a solid separates which is collected by filtration and then washed with alcohol and ether. The potassium salt thus obtained is dissolved in water. Upon acidification, solid (3-chloro-4-mercaptophenoxy)acetic acid separates, M.P. 135°–140° C.

Step D: 3-chloro-4-(4-heptylthio)phenoxyacetic acid.— A solution of sodium ethoxide in ethanol is prepared by adding 2.3 g. (0.1 g. atom) of sodium to 100 ml. of ethanol. To this is added 3-chloro-4-mercaptophenoxyacetic acid (0.052 mole). The resulting suspension is heated on the steam bath under reflux, for ¼ hour. Heating is then discontinued while 4-bromoheptane (18.0 g., 0.1 mole) is added slowly through a dropping funnel after which the reaction mixture is again heated under reflux for an additional 2 hours. After removal of about ½ the solvent, the residue is cooled and water is added. The excess bromide is removed by extraction with ether and the product is precipitated from the aqueous phase by acidification with dilute hydrochloric acid to afford 3-chloro-4-(4-heptylthio)phenoxyacetic acid.

Step E: 3-chloro-4-(4-heptylsulfonyl)phenoxyacetic acid.—A suspension of 3-chloro-4-(4-heptylthio)phenoxyacetic acid (0.025 mole) in a mixture of 25 ml. of glacial acetic acid and 25 ml. of acetic anhydride is cooled to 0° C. To this is added, dropwise, 30% hydrogen peroxide (9.1 g., 0.08 mole) over a period of ½ hour. The reaction mixture is stirred while the ice bath melts and the reaction is allowed to come to room temperature. The reaction mixture is poured onto crushed ice to yield 3-chloro-4-(3-heptylsulfonyl)phenoxyacetic acid.

By following the procedure described in Example 2, Steps A and B, and Example 4, Steps A through E, all of the products of this invention may be prepared. Thus, by substituting the appropriately substituted phenoxyalkanoic acid for the 3-chlorophenoxyacetic acid recited in Example 2, Step A, the corresponding (halosulfonylphenoxy)alkanoic acid is prepared which, when substituted for the (3-chloro-4-chlorosulfonylphenoxy) acetic acid of Example 2, Step B, and by employing an appropriate amine for the di-n-propylamine and following the procedure described therein, affords the corresponding sulfamoylphenoxyalkanoic acid product. The following equation and accompanying Table I illustrates the starting materials, intermediates and final products produced:

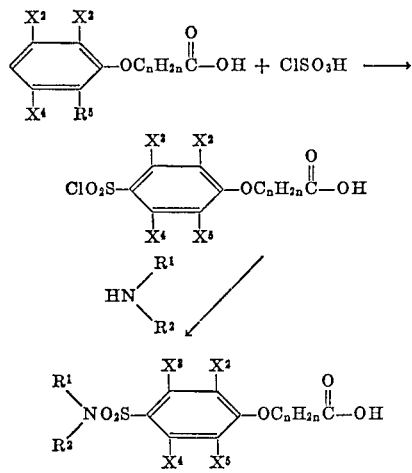

TABLE I

| Example No. | R¹ | R² | X² | X³ | X⁴ | X⁵ | —CₙH₂ₙ— |
|---|---|---|---|---|---|---|---|
| 5 | —C₂H₅ | —n-C₄H₉ | —Cl | —Cl | H | H | —CH₂— |
| 6 | H | —C₆H₁₃ | H | —F | H | H | —CH₂— |
| 7 | —C₂H₅ | —C₂H₅ | H | —CH₃ | H | H | —CH₂CH₂— |
| 8 | —n-C₅H₁₁ | —n-C₅H₁₁ | H | —CF₃ | H | H | —CH₂— |
| 9 | —CH₂CH₂CH₂CH₂— | | H | —NO₂ | H | H | —CH₂— |
| 10 | —CH₂CH₂—O—CH₂CH₂— | | H | —CN | H | H | —CH₂— |
| 11 | —CH₂CH₂CH₂CH₂CH₂— | | H | —Cl | H | H | —CH₂— |
| 12 | ⟨S⟩ | ⟨S⟩ | —CH=CH—CH=CH— | | H | H | —CH₂— |
| 13 | H | ⟨S⟩ | —CH₂CH₂CH₂CH₂— | | H | H | —CH₂— |
| 14 | —n-C₄H₉ | —n-C₄H₉ | H | —CO₂H | H | H | —CH₂— |
| 15 | —n-C₄H₉ | —n-C₄H₉ | —Cl | —Cl | —Cl | H | —CH₂— |

Alternatively, by substituting an appropriately substituted mercaptophenoxyalkanoic acid and hydrocarbyl halide for the 3-chloro-4-mercaptophenoxyacetic acid and 4-bromoheptane recited in Example 4, Step D, and following the procedure described in Steps D and E of that example, those products corresponding to Formula I wherein R is alkyl, cycloalkyl, alkenyl or alkynyl may be obtained. The following equation and accompanying Table II illustrates the manner by which the intermediates and final products may be produced:

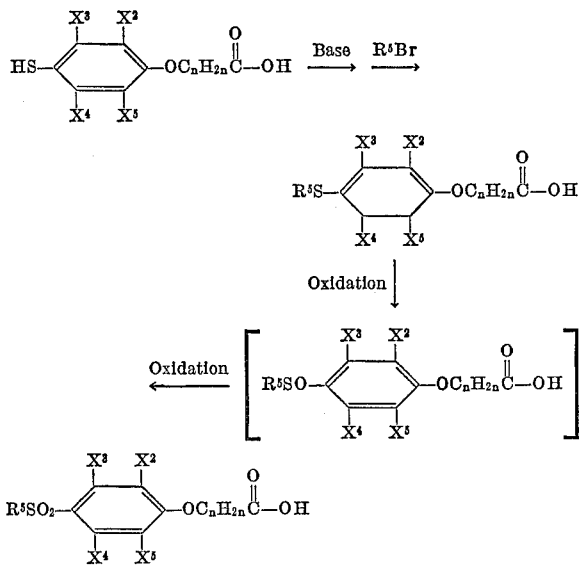

TABLE II

| Example number | $R^5$ | $X^3$ | $X^2$ | $X^4$ | $X^5$ | $-C_nH_{2n}-$ |
|---|---|---|---|---|---|---|
| 16 | $-n-C_4H_9$ | H | $-CH_3$ | H | H | $-CH_2CH_2-$ |
| 17 | $-CH_2CH=CHCH_3$ | Cl | Cl | H | H | $-CH_2-$ |
| 18 | $-CH_2C\equiv CCH_3$ | $-CH_3$ | $-CH_3$ | H | H | $-CH_2-$ |
| 19 | ⟨S⟩ | $-CH_2CH_2CH_2-$ | | H | H | $-CH_2-$ |
| 20 | ⟨S⟩ | H | Br | H | H | $-CH_2-$ |
| 21 | $-CH_2(CH_2)_3CH_3$ | H | Cl | H | H | $-CH_2-$ |
| 22 | $-CH(n-C_4H_9)_2$ | Cl | Cl | Cl | Cl | $-CH_2-$ |
| 23 | $-CH(n-C_5H_9)_2$ | Cl | Cl | H | H | $-CH[CH(CH_3)_2]-$ |
| 24 | $-CH(n-C_4H_9)_2$ | H | H | H | H | $-CH(C_2H_5)CH_2-$ |

The novel compounds of this invention are uricosuric agents which can be administered in a wide variety of therapeutic dosages in conventional vehicles as, for example, by oral administration in the form of a tablet or by intravenous injection. Also, the daily dosage of the products may be varied over a wide range as, for example, in the form of scored tablets containing 5, 10, 25, 50, 100, 150, 250 and 500 milligrams of the active ingredient for the symptomatic adjustment of the dosage to the patient to be treated. These dosages are well below the toxic or lethal dose of the products which may be administered in a total daily dosage of from 100 mg. to 2,000 mg. in a pharmaceutically acceptable carrier.

A suitable unit dosage form of the products of this invention can be administered by mixing 50 milligrams of 3-chloro-4-(di-n-butylsulfamoyl)phenoxyacetic acid or a suitable salt with 149 mg. of lactose and 1 mg. of magnesium stearate and placing the 200 mg. mixture into a No. 2 gelatin capsule. Similarly, by employing more of the active ingredient and less lactose, other dosage forms can be put up in No. 2 gelatin capsules and, should it be necessary to mix more than 200 mg. of ingredients together, larger capsules may be employed. Compressed tablets, pills, or other desired unit dosages can be prepared to incorporate the compounds of this invention by conventional methods and, if desired, can be made up as elixirs or as injectable solutions by methods well known to pharmacists.

It is also within the scope of this invention to combine two or more of the compounds of this invention in a unit dosage form or to combine one or more of the compounds of this invention with other known uricosurics or with other desired therapeutic and/or nutritive agents in dosage unit form.

The following example is included to illustrate the preparation of a representative dosage form:

EXAMPLE 25

Dry-filled capsules containing 50 mg. of active ingredient per capsule

| | Mg. per capsule |
|---|---|
| 3-chloro-4-(di-n-butylsulfamoyl)phenoxyacetic acid | 50 |
| Lactose, U.S.P. | 149 |
| Magnesium stearate, U.S.P. | 1 |
| Capsule (size No. 2) | 200 |

The 3-chloro-4-di-n-butylsulfamoylphenoxyacetic acid is reduced to a No. 60 powder and then lactose and magnesium stearate are passed through a No. 60 bolting cloth onto the powder and the combined ingredients admixed for 10 minutes and then filled into a No. 2 dry gelatin capsule.

Similar dry-filled capsules can be prepared by replacing the active ingredient of the above example by any of the other novel compounds of this invention.

It will be apparent from the foregoing description that the (sulfonyl and mono- and di-substituted sulfamoyl-phenoxy)-alkanoic acid products (I) of this invention constitute a valuable class of compounds which have not been prepared heretofore. One skilled in art will also appreciate that the processes disclosed in the above examples are merely illustrative and are capable of a wide variation and modification without departing from the spirit of this invention.

We claim:

1. A compound of the formula:

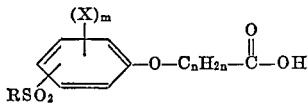

where in R is alkyl, cycloalkyl, alkenyl, alkynyl or a primary or secondary amino radical of the formula

wherein $R^1$ is hydrogen, alkyl or cycloalkyl; and $R^2$ is alkyl or cycloalkyl; X is halo, lower alkyl, nitro, trihalomethyl or carboxy or two X radicals on adjacent carbon atoms may be joined to form a hydrocarbylene chain containing from 3 to 4 carbon atoms between their points of attachment, $m$ is an integer having a value of 0–4 and $n$ is an integer having a value of 1–4, and the non-toxic, pharmaceutically acceptable salts and esters thereof.

2. A compound according to claim 1 of the formula:

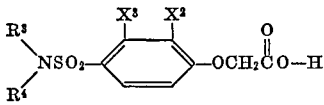

wherein $R^3$ and $R^4$ are lower alkyl; $X^2$ and $X^3$ are selected from hydrogen, halo or trihalomethyl.

3. A compound according to claim 2 wherein $R^3$ and $R^4$ are lower alkyl; $X^2$ is hydrogen and $X^3$ is halo.

4. A compound according to claim 2 wherein $R^3$ and $R^4$ are lower alkyl and $X^2$ and $X^3$ are hydrogen.

5. A compound according to claim 2 wherein $R^3$ and $R^4$ are lower alkyl; $X^2$ is hydrogen and $X^3$ is trihalomethyl.

6. A compound according to claim 3 wherein $R^3$ and $R^4$ are n-butyl; $X^2$ is hydrogen and $X^3$ is chloro.

7. A compound according to claim 4 wherein $R^3$ and $R^4$ are n-butyl; $X^2$ and $X^3$ are hydrogen.

8. A compound according to claim 5 wherein $R^3$ and $R^4$ are n-butyl; $X^2$ is hydrogen and $X^3$ is trifluoromethyl.

9. A compound of the formula:

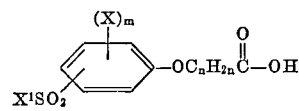

wherein X is halo, lower alkyl, nitro, trihalomethyl or carboxy or two X radicals on adjacent carbon atoms may be joined to form a hydrocarbylene chain containing from 3 to 4 carbon atoms between their points of attachment, $X^1$ is halo, $m$ is an integer having a value of 0–4 and $n$ is an integer having a value of 1–4.

10. A compound according to claim 9 of the formula:

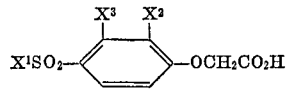

wherein $X^2$ and $X^3$ are hydrogen, halo or trifluoromethyl and $X^1$ is halo.

11. A compound according to claim 10 of the formula:

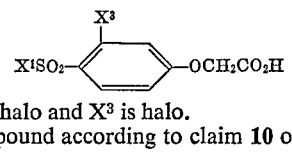

wherein $X^1$ is halo and $X^3$ is halo.

12. A compound according to claim 10 of the formula:

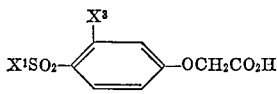

wherein $X^1$ is halo and $X^3$ is trihalomethyl.

13. A compound according to claim 10 wherein $X^3$ is chloro.

14. A compound according to claim 10 wherein $X^3$ is trifluoromethyl.

References Cited

Finar, I. L., Organic Chemistry, vol. I (1963), pub. by R. Clay and Co., Ltd., Great Britain, pp. 340 and 611 cited.

Theilheimer, W., Symthetic Methods of Organic Chem., vol. 5 (1951), Interscience, Inc., New York, pp. 81 and 82 relied on.

Greene, J. L., et al., J. Am. Chem. Society, vol. 77 (1952), pp. 3016 to 3018 relied on.

HENRY R. JILES, Primary Examiner

L. THAXTON, Assistant Examiner

U.S. Cl. X.R.

260—247.2 R, 247.2 A, 247.2 B, 293.83, 294.8, 326.3, 516, 471 R, 473 F, 474 G, 501 H, 520, 521 R, 521 A, 559 T; 424—309, 316, 319